United States Patent
B.K.

(10) Patent No.: US 12,530,395 B2
(45) Date of Patent: Jan. 20, 2026

(54) METHODS FOR STORING, ACCESSING AND RENDERING MULTIMEDIA FILE AND ITS METADATA

(71) Applicant: ROSM GLOBAL SERVICES PVT LTD., Bangalore (IN)

(72) Inventor: Sumana B.K., Bangalore (IN)

(73) Assignee: ROSM GLOBAL SERVICES PVT LTD., Bangalore (IN)

( * ) Notice: Subject to any disclaimer, the term of this patent is extended or adjusted under 35 U.S.C. 154(b) by 50 days.

(21) Appl. No.: 17/769,519

(22) PCT Filed: Oct. 16, 2020

(86) PCT No.: PCT/IB2020/059753
§ 371 (c)(1),
(2) Date: Apr. 15, 2022

(87) PCT Pub. No.: WO2021/074873
PCT Pub. Date: Apr. 22, 2021

(65) Prior Publication Data
US 2023/0082668 A1    Mar. 16, 2023

(30) Foreign Application Priority Data
Oct. 16, 2019   (IN) .............................. 201941041883

(51) Int. Cl.
*G06F 16/00* (2019.01)
*G06F 16/48* (2019.01)
(52) U.S. Cl.
CPC .................................. *G06F 16/48* (2019.01)
(58) Field of Classification Search
CPC ..................................................... G06F 16/48
See application file for complete search history.

(56) References Cited

U.S. PATENT DOCUMENTS

2002/0069218 A1* 6/2002 Sull ...................... G11B 27/105
715/201
2017/0169128 A1* 6/2017 Batchu Krishnaiahsetty ..............
H04N 21/8456

FOREIGN PATENT DOCUMENTS

| AU | 2003268827 A1 | 1/2004 |
| WO | 2011053052 A2 | 5/2011 |
| WO | 2015162548 A1 | 10/2015 |

OTHER PUBLICATIONS

Indian Patent Office, International Search Report and Written Opinion of the International Searching Authority for International Application No. PCT/IB2020/059753, mailed Feb. 12, 2021, 9 pages.
Indian Patent Office, First Examination Report for Indian Patent Application No. 201941041883, mailed Mar. 3, 2022, 7 pages.

* cited by examiner

*Primary Examiner* — Paul Kim
(74) *Attorney, Agent, or Firm* — Richard C. Himelhoch; UB Greensfelder LLP

(57) ABSTRACT

The present disclosure provides a system and methods to consume metadata and its associated multimedia file independently while supporting tandem consumption of the two as and when needed. It defines a framework for achieving the tandem consumption of the metadata file and the multimedia file using predefined types of metadata, referred to as 'linkage-metadata'. Each type of linkage-metadata has predefined interpretations for the two rendering programs, namely metadata manipulator and multimedia manipulator.

29 Claims, 13 Drawing Sheets

Fig 1a: Media file with QR-Code

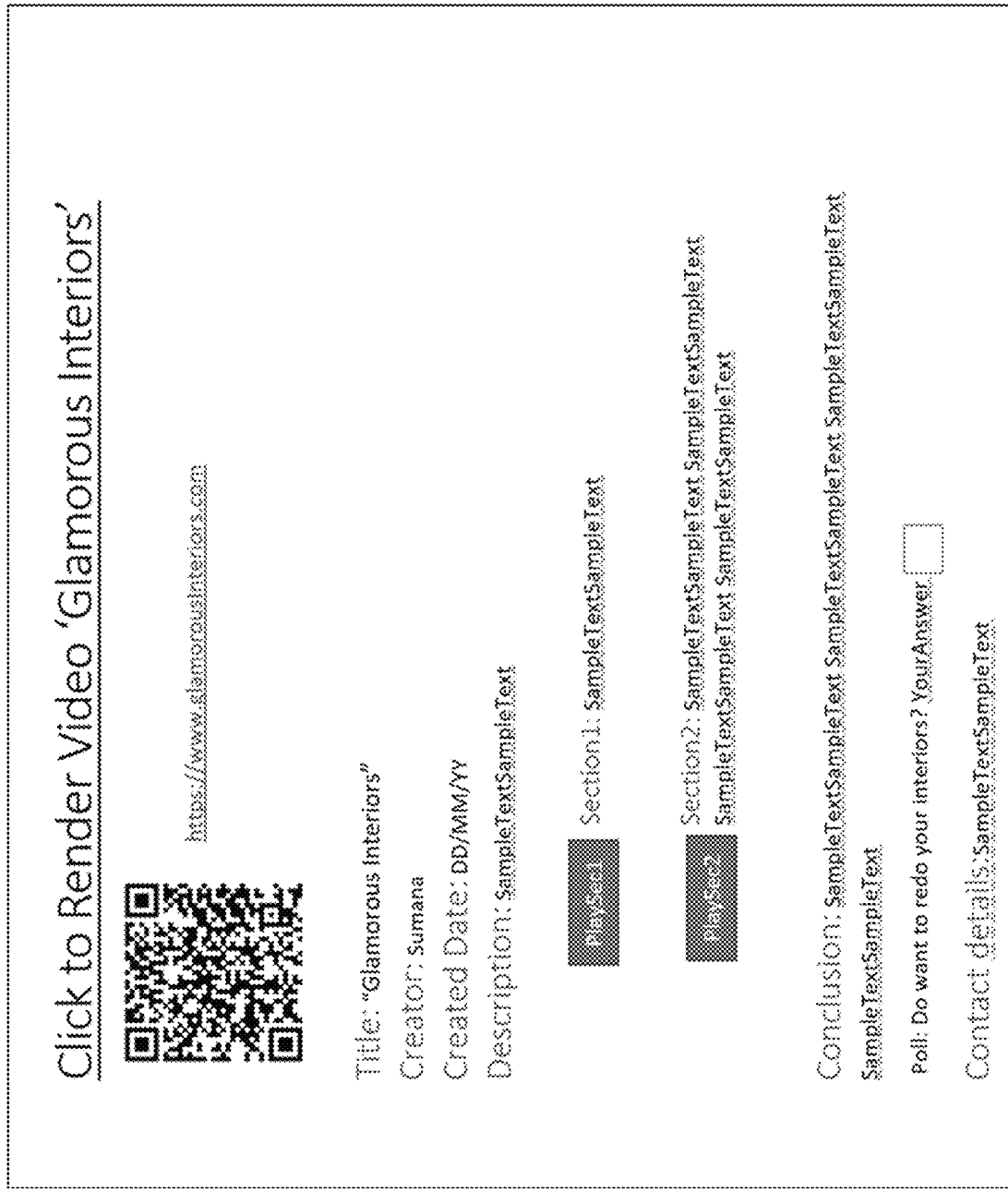

Fig1c: Unprocessed(Raw) Metadata file for the video 'Glamorous Interiors'

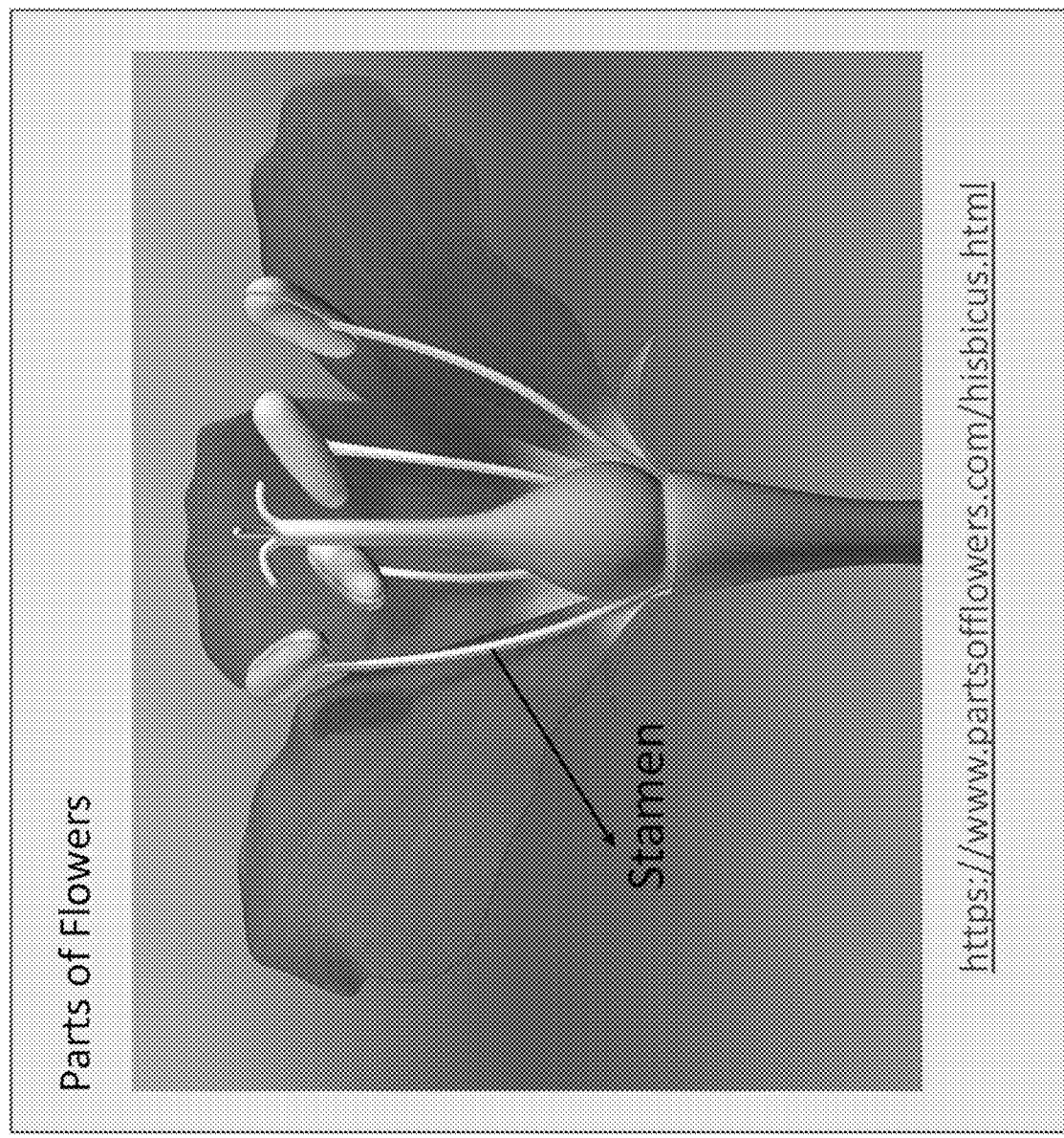

Figure 2b : Metadata Rendered

Parts of Flowers
(https://www.partsofflowers.com/hisbicus.jpg)
Created Date=DD/MM/YY
Description: This is a beautiful flower that blooms in the spring season. This is a beautiful flower that blooms in the spring season. This is a beautiful flower that blooms in the spring season Parts of a Flower | DISPLAYALL | Stamen | Stigma | Ovary | Style

Figure2c: Unprocessed(Raw) Metadata File for an Image File

Flower & its Parts ( https://www.partsofflowers.com/hisbicus.jpg )

Created Date=DD/MM/YY

Description: This is a beautiful flower that blooms in the spring season. This is a beautiful flower <MEDIA-POINTER x=50,y=50>

<button onclick="ShowTitle()" type="button">Parts of a Flower</button></MEDIA-POINTER>

<MEDIA_POINTER x=100,y=130>

<button onclick="ShowAll()" type="button">Display All Parts</button>

<MEDIA_POINTER x=456,y=130

<button onclick="ShowPointer()" type="button">Stamen</button></MEDIA-POINTER>

<MEDIA_POINTER x=568,y=115

<button onclick="ShowPointer()" type="button">Stigma</button></MEDIA-POINTER>
<MEDIA_POINTER x=570,y=417

<button onclick="ShowPointer()" type="button">Ovary</button></MEDIA-POINTER>
<MEDIA_POINTER x=1646,y=1093

<button onclick="ShowPointer()" type="button">Stylus</button></MEDIA-POINTER>

</MEDIA-POINTER>

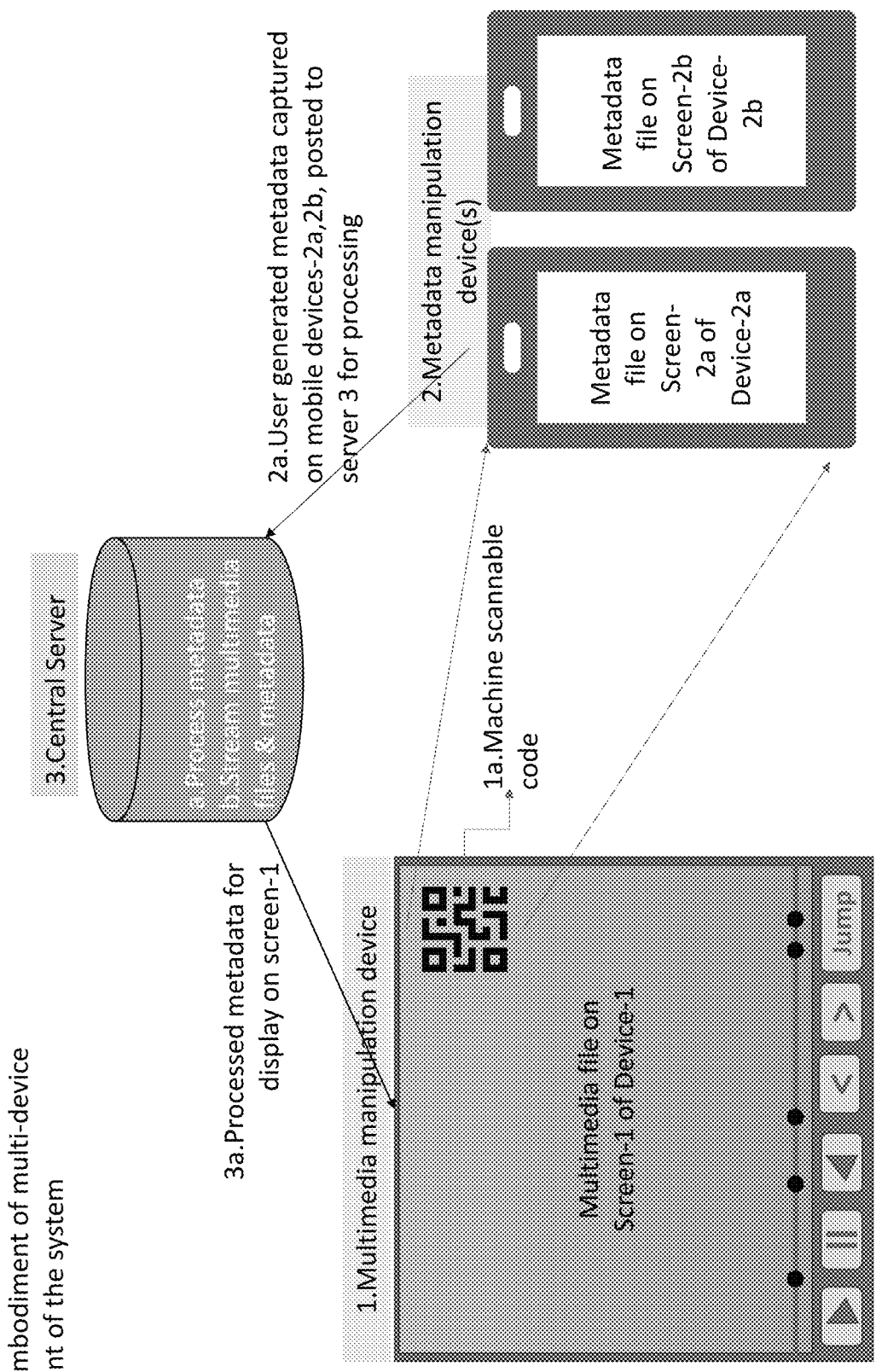
Fig4: An embodiment of multi-device deployment of the system

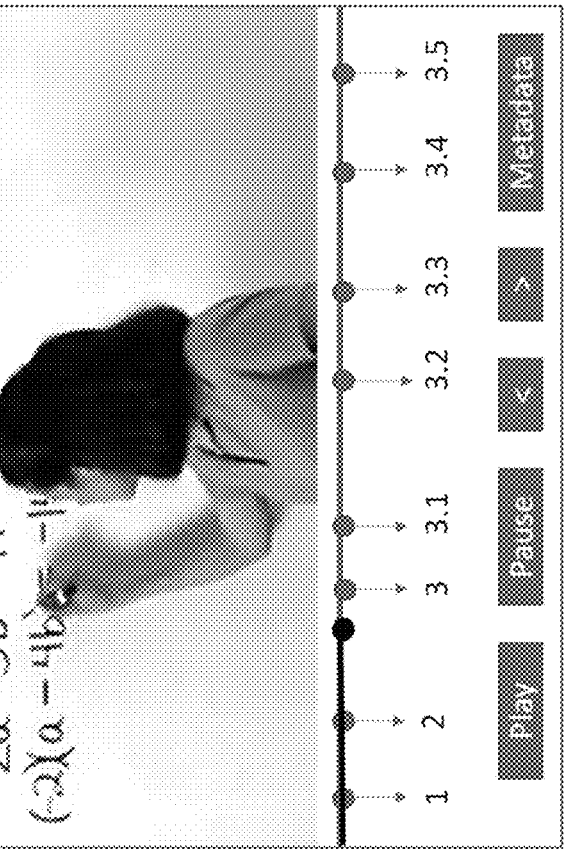
Figure5a: Refer to document version of Figures Digital book with videos

Matadatafile-part2 (Frame3)

1. Linear equations in two variables
2. Solution of a linear equation An equation of the form An equation of the form An equation of the form An equation of the form An equation of the form...
3. Methods of solving simultaneous linear equations An equation of the form An equation of the form An equation of the form An equation of the form An equation of the form...

3.1 Substitution method
   $A_1x+B_1y+C_1 = 0$
   $A_2x+B_2y+C_2 = 0$ 3.2 Example for substitution method An equation of the form An equation of the form An equation of the form An equation of the form An equation of the form...

3.3 Elimination method

An equation of the form An equation of the form An equation of the form An equation of the form An equation of the form...

3.4 Example of elimination method

An equation of the form An equation of the form An equation of the form An equation of the form An equation of the form...

3.5 Cross multiplication method

An equation of the form An equation of the form An equation of the form An equation of the form An equation of the form...

3.6 Example of cross multiplication method

An equation of the form An equation of the form An equation of the form An equation of the form An equation of the form...

FIG.5c (continued)

Ideally on 2nd Device

MetadataFile-Part3 (Frame 4) for new Dynamic Metadata

Note-1 (DD:HH:MM:SS): SampleNote SampleNote SampleNote
Note-2 (DD:HH:MM:SS): SampleNote SampleNote SampleNote
Note-3 (DD:HH:MM:SS): SampleNote SampleNote SampleNote
Note-4 (DD:HH:MM:SS):

$$(a+b)^2 = a^2 + b^2 + 2ab$$

METHODS FOR STORING, ACCESSING AND RENDERING MULTIMEDIA FILE AND ITS METADATA

CROSS-REFERENCE TO RELATED APPLICATIONS

The present application is a U.S. national stage filing of International Application No. PCT/IB2020/059753 filed Oct. 16, 2020, which claims priority to and the benefit of Indian Application No. 201941041883 filed Oct. 16, 2019, the contents of which are incorporated herein by reference and made a part hereof.

TECHNICAL FIELD

The present disclosure relates generally to multimedia technologies. More specifically, the present disclosure relates to a method and a system to facilitate creation, modification and consumption of metadata associated with a multimedia file.

BACKGROUND

Multimedia files can be associated with a lot of metadata that supplements the multimedia content itself. For many practical reasons it is best to assume, that a multimedia file has two distinct components, namely the media content itself and its associated metadata. In many cases, like in a video lesson, the quantity of metadata could be large. For e.g. metadata could be a textual description of a video lesson. But rendering the metadata along with the content of the multimedia file can result in overloading the consumer with information that may always not be relevant and to all people. In fact, it might impair effective consumption of the multimedia content in many cases. Further, on demand consumption of metadata associated with multimedia files on displays such as television may not be possible with some hardware or could be cumbersome. Also, when a multimedia file is rendered in a multi-user environment, different users might have different levels of interest in the associated metadata and the multimedia file. For instance, there may be users who are more interested in the media than the metadata and vice-versa. In addition, different users may sequence or prioritize the consumption of the two components differently. There may be users who will review the metadata before consuming the media-content and the other way too. Above all, consuming multimedia files such as videos and audios are time consuming, and hence users may want to skim through by reading the metadata and watch only some sections of the multimedia file, especially if doing a repeat play of a video lesson. Also, a user should be able to switch between the two components as needed. Thus, there are scenarios, where there is a need to facilitate access of multimedia content and its respective metadata independently and simultaneously. In some cases, this may be needed over different devices or screens, especially in a multi-user environment, say in a classroom and in other cases, both the components may be consumed on the same device.

Due to reasons stated above, there is a need to facilitate on-demand and independent consumption of the media file and its metadata, as per user's requirement at any given time. In a multi-user environment, if the metadata and the media-file can be consumed on different devices or screens, needs of a greater number of users can be addressed. Also, there is a need for a way to access either of these components, namely multimedia file, and metadata file, first and then effortlessly reach the other component.

There are also user requirements where the metadata needs to be edited or augmented by the user. Examples for user generated data can include, for e.g., answers to a quiz/survey, or personal notes and comments on the media file. In some scenarios, especially in multi-user environments, this may have to be done without interrupting the rendering of the multimedia file. For example, in a classroom of students watching a video lesson, students may want to take personal notes on a video lesson. Such notes may be used during subsequent video replay, say at home. Further, consuming multimedia file is often slower than consuming the metadata related to the multimedia file. So, a user should be able to switch between the two components as needed.

Today, there is no convenient solution to provide this flexibility and meet these needs. This disclosure servers to fill that gap.

SUMMARY

The present disclosure provides a solution to consume metadata and its associated multimedia file independently while supporting tandem consumption of the two if needed. It defines a framework for achieving the tandem consumption of the metadata file and the multimedia file using predefined types of metadata, referred to as 'linkage-metadata' here. Linkage-metadata is identified by predefined metadata tag or a predefined prefix to relevant metadata tag. In the examples listed in the below description, a predefined metadata prefix called <MEDIA_> is used to denote all metadata that is linking metadata file to the multimedia file. Each type of linkage metadata has predefined interpretations for the two rendering programs, namely metadata manipulator and multimedia manipulator. In an embodiment, metadata meant for rendering on multimedia manipulator can be referred to by a predefined prefix such as <MEDIA_DISPLAY> with optional attributes to denote formatting information. The solution also includes ways to accept user input to be sent to the metadata manipulator program for processing and storage. That means, solution includes ways to accept user input using suitable user interfaces and facilitate storage of the same with the rest of the metadata and also be overlaid on multimedia file, if & when needed.

In an embodiment, the present disclosure may relate to a system and methods to use two separate processes to manipulate the multimedia file and its metadata file, where one process, namely multimedia manipulator, manipulates multimedia file and the other process, namely metadata manipulator, manipulates the metadata file that stores metadata associated with the said multimedia file. The term manipulate refers to various operations that can be performed by the manipulator program on the content file. For e.g. Media manipulator program manipulates the media file when it plays, navigates by jumping to a specific location, accepts user input, displays metadata, communicates with metadata manipulator, etc. Similarly, metadata manipulator manipulates the metadata content file when it edits, receives & computes metadata, renders, navigates, searches, controls media file's current position or navigation, etc. The metadata file or metadata resource referred to here could be any of a flat file with some data & scripts to access data from other sources such as a database file, a data structure in memory, a cache file, etc. Metadata resource comprises data that describes, complements & supplements the media file. Further, the system and method includes initiating any one of the two processes first and the other process's program can be accessed and initiated either programmatically or as a result of a preconfigured user action, through an URL to the other program available in the first file being manipulated.

The foregoing summary is illustrative only and is not intended to be in any way limiting. In addition to the illustrative aspects, embodiments and features described above, further aspects, embodiments, and features will become apparent by reference to the drawings and the following detailed description.

BRIEF DESCRIPTION OF THE DRAWINGS

The embodiments of the disclosure itself, as well as a preferred mode of use, further uses and advantages thereof, will best be understood by reference to the following detailed description of an illustrative embodiment when read in conjunction with the accompanying drawings. One or more embodiments are now described, by way of example only, with reference to the accompanying drawings in which:

FIG. 1a illustrates an exemplary embodiment to display a video on television with QR-Code pointing to metadata in accordance with an embodiment of the present disclosure;

FIG. 1b illustrates a rendered metadata file for a media file that is a video in accordance with an embodiment of the present disclosure;

FIG. 1c illustrates an unrendered (raw) metadata file for the above media file in accordance with an embodiment of the present disclosure;

FIG. 2a illustrates an exemplary embodiment to display an image file with overlaid partial metadata based on user input in accordance with an embodiment of the present disclosure;

FIG. 2b illustrates a rendered metadata file for the image in FIG. 2a in accordance with an embodiment of the present disclosure;

FIG. 2c illustrates unrendered (raw) metadata file for the above image file;

FIG. 4 illustrates an embodiment of multi-device deployment of the system, where a central server consolidates dynamic metadata from many user devices and streams it back to the multimedia-manipulator;

FIG. 5a illustrates an exemplary embodiment of a videobook or a digital-book on a single device with Table-of-Contents in a separate frame that can be positioned as convenient;

Figure 3:
FIG. 3 illustrates an exemplary embodiment to display a video on television with QR-Code pointing to metadata displayed on the media, at the beginning of the program, end of the program and on demand during a program, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure provides a method and a system to facilitate consumption of a multimedia file and its associated metadata independently and in-tandem on separate screens of the same device or on separate devices on a common network, in order to ease viewers' requirement of having to switch between the two types of information on need basis. For e.g. students would like to switch between textual content and video content for a lesson, at will, for effective learning based on the purpose, such as first-time learning, or revision. The metadata in this context is defined as additional content that describes, supplements, or complements the contents of the multimedia file itself. FIG. 1a illustrates an exemplary embodiment of displaying metadata URL (Universal Resource Locator) encoded as a QR-Code (Quick response Code) displayed on or near the multimedia file. The metadata can be conveniently consumed on a different device altogether without interrupting the rendering of the multimedia file. Further, in exemplary embodiments, the URI or QR-CODE pointing to metadata can be rendered as an interactive cue that responds to user input such as click, touch, tap, voice commands, etc., to render the metadata pointed to by the URI. FIG. 1b illustrates an exemplary metadata file with a QR-Code pointing to multimedia file, wherein the metadata manipulator can be instantiated first, and by clicking on the URL/QR-Code in the metadata file, the multimedia file itself can be instantiated.

The present disclosure proposes that separate processes be used to consume the multimedia file and its metadata file. The program used to consume the multimedia file is called multimedia manipulator and the program used to consume the metadata file is called metadata manipulator. In this context, the term 'manipulator' is used to denote a program that can perform at least one of the following operations on a file: i) render or play, ii) create, ii) modify, iii) navigate, iv) search, v) encode/decode, vi) abridge, vii)transmit or use the file in any other manner.

In some embodiments, in order to facilitate the feature-rich tandem consumption of the two files, namely metadata file and multimedia file, it will be required for the users to be able to toggle between the two programs and to jump from the metadata file to the related section in multimedia file and vice-versa. To achieve such tandem consumption, Metadata file will comprise metadata interspersed with file-pointers or file-marks to multimedia file, called linkage-metadata; wherein the metadata preceding, following or around a linkage-metadata in the metadata file is relevant to the multimedia file section preceding, following or around the point denoted by linkage-metadata. Since the metadata file is consumed by humans as well as programmatically processed by the two manipulator programs, the linkage-metadata (or file-marks) needs to be easily identifiable both by humans and programs. This is best achieved by using predefined tags with special names or characters. Using xml/html like syntax, where tags can have attributes and sub-elements, it is also easy to encapsulate metadata relevant to a specific linkage-metadata within its sub-elements & attributes.

Also, in order to usefully communicate between themselves, the two manipulator programs will have to establish a communication channel between themselves to enable passing of event triggers and metadata from one program to the other. Such a communication channel can be uni-directional or bi-directional, based on the needs of specific deployment scenarios.

In an embodiment where the manipulator processes are running on the same device, their processes can be configured to use one or more 'inter process communication' (IPC) protocols such as pipes, named-pipes, shared memory, message passing, message ques, FIFO, direct messaging, indirect messaging, etc., to establish a communication channel and exchange data. In some special cases, a combination of one or more communication protocols could also be used to achieve the desired results. Here is an example for a simple embodiment: the first process initiating the second process, passes a handle to its instance to the second process, so that the second process can raise events on the first process and also pass on data as parameters. Further, in an embodiment requiring two-way communication, the second process can return a handle to its instance to the first process to enable the first process to raise events and send data as parameters to the second process.

In some embodiments, the two processes could be running on different devices without shared memory but connected to a common network. In such a scenario, the processes can be programmed to communicate with each other by using 'Remote procedure call' (or RPC), wherein the RPC can be of types such as Callback RPC, Broadcast RPC or Batch-mode RPC. In an exemplary embodiment, the URL for the metadata file is part of the multimedia file and is displayed on or near the multimedia file for easy access, either always or on-demand in response to user input such as a click, tap, swipe, etc. Metadata URL can be displayed as a hyperlink, a user-interface-control or as a machine recognizable code such as a QR-Code, barcode, morse-code, or a new type of code altogether. The new code could perhaps be a better version derived from any or combination of the known codes. Special purpose machine-readable code can be designed to point the URL to a mobile application or a screen in a mobile application as well. Such a special purpose code could also be a modified version of an existing code such as QR-Code, bar-code, morse code or any other known machine recognizable codes.

Similarly, URL for the multimedia file is part of the metadata file to facilitate initiation of the multimedia manipulator from the metadata file. Here again, the URL can be represented as at least one of a hyperlink, any machine readable code and as a user-interface-control.

In an exemplary embodiment, the URL or QR-Code displayed on the multimedia file is dynamically generated by the multimedia player, wherein the QR-Code not only encodes URL pointing to the metadata, but also encodes at least one of i) the start-time of media play and ii) current position of playing media file in terms of time-offset or frame-offset; so that any additions to the metadata captured by the metadata manipulator can be time-synchronized with multimedia file to ensure accurate overlay of the metadata onto media file. The process of synchronising the new metadata with the multimedia file is detailed in the granted patent: U.S. Pat. No. 10,552,482 B2 "An electronic system and method for marking highlights in a multimedia file & manipulating the multimedia file using the highlights". Dynamic generation of URL or machine-readable-Code can be initiated at user's request through a designated UI control or done at predefined periodicity and at the end of media rendering, to enable synchronization of new metadata to the multimedia file.

As detailed in the prior art U.S. Pat. No. 10,552,482 B2, metadata of a multimedia file comprises three main kinds such as static data (does not change with time), dynamic data (changes during the file's lifetime) and user-specific data, which is a special case of dynamic data. User specific data comprises data created by a user, wherein data belongs to that user. Data created by a user, may or may not be relevant to other individual users. For e.g. Individual user's score for a quiz may not be of interest to other users. User-specific data is a special case of dynamic metadata that can be treated as public or private, based on configurable qualifiers associated to that metadata.

As per the present disclosure, metadata contained in the metadata file can comprise of any types of data elements including alphanumeric text such as, images, audio clips, video-clips, complex data structures like pointers to program snippets that query a database or URLs/URIs (Universal Resource Identifier) to access data stored elsewhere, linked-lists or multi-dimensional arrays of simple or complex datatypes, etc. These data elements can be structured as needed without any stringent restrictions. For e.g. Metadata could be in the form of a document, plain text or a structured file comprising xml or html like representation.

However the metadata that is used to establish a linkage with the multimedia file (called as Linkage-Metadata or Linkage-Tags here after) or passed to the multimedia manipulator, is represented using specific predefined XML/HTML like Tags with associated one or more attributes with optional values and sub-elements (that are similar Tags described above), wherein the values can be of any known data types, including the ones listed above. The stringent format requirement for the linkage-metadata is because it has to be programmatically parsed and processed by the rendering programs.

In an exemplary embodiment, images can have metadata overlaid on it on user demand by clicking on the buttons as shown in FIGS. 1a, 1b and 1c. 'Button' metadata can be supplemented with attributes/arguments or additional metadata such as <MEDIA_DISPLAYFORMAT> that define the type of visual markings in terms of colour, shape, size, icons, animated images or GIFs like concentric circles, etc. One exemplary embodiment can have lines or arrows pointing to the position with metadata displayed as labels that describe the content.

Metadata can be structured in various ways, depending on specific business case being addressed. One construct that can be used to structure the metadata could be by using XML or HTML like syntax. The metadata resource itself is identified by an URL (universal Resource Locator). A huge advantage of using a syntax such as XML or HTML is that, it helps represent data in a hierarchical & nested manner facilitating grouping of related elements into sets for better manipulation and rendering of metadata. The other benefit is that editors and browsers that can read these XML/HTML files are already in use and might require minimal upgrades to support new types of elements and methods to implement this disclosure. Hierarchical structuring of metadata facilitates collapsing of a set of metadata into a single entry that can be expanded on need basis, thereby decluttering the metadata representation. Such representation can facilitate easier understanding of content also. Further, html like syntax supports definition of program snippets akin to JavaScript, that can be executed for retrieving data from a database or any other storage, rendering the metadata and navigating through the metadata.

In embodiments where the media manipulators are specialized new kind of programs and the metadata resource files have new type of extensions, the manipulator programs have to be associated with specific file extensions that resource files use at the operating system level, so as to make opening of the resource files really seamless.

In some embodiments, the URL containing the metadata can include program snippets that may help in processing the metadata, rendering the metadata, execution of some transactions, facilitate search within the metadata file to quickly display relevant details, etc. These program snippets are like the JavaScript functions or methods in a html page. The methods may also help to retrieve or store, parts of the metadata into an external storage area such as a database. Further, in some embodiments, Metadata file can be devoid of most of the metadata and comprise only programs to retrieve metadata from an external storage resource such as a database and then render the same as a HTML file for user consumption. This may particularly be required to manage 'User-Specific' metadata or 'Dynamic' metadata captured at play-time. The queries to database may be executed for a user-id currently logged-in or using the multimedia file. The metadata rendered may be a subset of the entire metadata associated to a multimedia file and a function of logged-in user profile, device profile and metadata ownership. Further, the metadata file comprising html or xml like syntax can look different when rendered visually by metadata-manipulator, making it easier to consume. For instance, a subset of metadata represented by a data structure could be collapsed into a single heading, and details revealed only on user input to expand the structure. Further such structure headings can be organised into a table-of-contents (TOC) for metadata file. Another approach to creating table-of-contents that can be used with the multimedia file also, is to only use sections of the metadata that are associated with Linkage-metadata containing file-pointer to the multimedia file.

In an embodiment, there can be two table-of-contents (TOC), one for the metadata file and the other for the multimedia file. Multimedia TOC can be like the one described above with only entries from Linkage-metadata. However, the metadata TOC can be a larger more detailed one, with all relevant entries including ones not linked to Linkage-metadata, which can be created using a typical word processor kind of functionality. However as per this disclosure, the entries in the TOC having a linkage-metadata will contain an additional user-control to manipulate the multimedia file by playing the media from the point denoted by linkage-metadata.

In most embodiments, Linkage-Metadata is essentially a predefined xml/html tag with positional data as parameters. It can comprise of data and more sub-elements that are another set of predefined tags. Linkage-metadata can also have methods to trigger preconfigured events on media-manipulator with some metadata as parameters. The key event triggers that need to be supported are 'play media from a defined position' and 'play a defined segment of the media' while optionally displaying designated metadata parameters either before beginning of play or after playing. In typical implementations, the metadata that is displayed at a particular linkage-metadata is determined by adjacency of that metadata to the linkage-metadata, and the metadata having a predefined tag indicating it needs to be displayed. The term adjacency here means 'next to' or 'enclosed by the begin and end tags of Linkage-metadata'.

Sub-element tags within a linkage-metadata can comprise of metadata of any known datatypes, including text, images, audio clips, video-clips, data structures like a pointer to a program. Some of the metadata, denoted by certain sub-element tags, may have to be rendered on the multimedia file for better user experience. Such metadata is called Display-Metadata and are qualified by special tags known as Display-Tags. In an embodiment, a metadata of type 'pointer to a program' can be invoked to query a database or URL (Universal Resource Locator) to fetch data stored elsewhere and then packaged into a linked-list or multi-dimensional array of elements to make for e.g. a survey questionnaire, to be displayed for new user input. User input so captured gets processed, stored, and may optionally be passed onto the media file for display if qualified by Display-Tags or through an event trigger initiated by user.

The linkage-metadata is used in three different situations to communicate with the multimedia player. These are as follows. i) when the multimedia-manipulator or player pre-reads the metadata file to display specified metadata on the media file at load time. ii) when user needs to watch media file segment relevant to metadata being read on metadata manipulator. This is done by interrupting the media player on user input through an UI control in metadata file (e.g. button 'PlaySec1' of FIG. 1*b*), to reposition cursor to a specified position and playing media from that position. iii) when metadata manipulator has captured some dynamic metadata such as notes or poll responses that needs to be displayed by the media-manipulator. This will result in creation of new linkage-metadata based on the time of new data creation.

Linkage-metadata can be broadly classified into two types based on whether it is referencing a point on the media file or a segment of the media file. In the following examples, these are represented using two different Linkage-metadata elements named as: MEDIA-POINTER & MEDIA-SEGMENT. Since the metadata-manipulator & media-manipulator have to recognise these elements, they use pre-configured Tag or element names and attributes. The actual specifics of the communication between the metadata-manipulator & media-manipulator will be defined by the set of sub-elements and their attributes contained in linkage-metadata element. Listed below is a representative set of sub-elements and attributes that comprise Linkage-metadata elements. Some of the sub-elements may be optional and hence missing in some implementations. Also, for each linkage-metadata, sub-elements may be applicable at pre-play (also called pre-load) time and/or playtime and these are identified suitably; either using pre-configured element names or some preconfigured attributes. As an example, we use an attribute called usage-time="Play-Time" to signal to the metadata parser that a specific element is only relevant at play-time. Absence of attribute 'Play-Time' is interpreted as 'Load-Time' display needed for the said metadata in typical embodiments. When Display-Tags are qualified by attribute 'Usage-Time=Play-Time', multimedia manipulator spawns-off a cron job to render the Display-metadata at the precise time-offset denoted by the enclosing parent Linkage-metadata tag; as per an exemplary embodiment.

In addition to Media-Display tags (also called Display-Tags) and Linkage-Metadata tags (also called Linkage-Tags), there is a third type of metadata called as Method-Tags, that denotes trigger methods to be executed when a nested UI control is selected by user. Method tags can be of three types, based on which program is supposed to execute the trigger method. The Method-Tag's program can be executed by any of the following: metadata manipulator, multimedia manipulator or external program as denoted by the tag name or predefined attributes to the Method-Tag. Given below is an exemplary set of Linkage-metadata elements that can be found in a metadata file. Also in the below example, a Method tag called Media-Action-Control tag denotes an interrupt program to be executed by media-manipulator at 'Play-Time' upon user's selection of the button 'PlayFromHere'.

---

Usage of Linkage-Metadata type 'MEDIA-POINTER': Example-1

```
<MEDIA-POINTER Time-offset='180' >
    <Media-Display Label="1.5" Caption="Sec1.5: Planets of Sun"
    Dur="20s"></Media-Display>
    <Media-Action-Control usage-time= "Play-Time">
        <button onclick-"Trigger-setCurTime (180)"
        type="button">PlayFromHere</button><br>
    </Media-Action-Control>
    <Metadata>
        This chapter teaches you about our solar system's nine planets. It
        covers various aspects about our solar system's planets.
        Sample text Sample text Sample text Sample text Sample text
        Sample text Sample text
    </Metadata>
</MEDIA-POINTER>
```

Usage of Linkage-Metadata type 'MEDIA-SEGMENT': Example-2

```
<MEDIA-SEGMENT Time-offset1="250" Time-offset2="450">
    <Metadata>
        This segment of the media will describe planet earth, it's unique
        atmosphere that supports life.......sample text sample text sample
        text sample text sample text sample text sample text sample
        text sample text sample text sample text sample text
    </Metadata>
    <Segment-Line width="2p"> </Segment-Line>
    < Media-Display>Planet Earth</Media-Display>
    <Media-Action-Control usage-time="Play-time">
        <button onclick="Trigger-playSegment (Time-offset1,
        Time-offset2)"
        type="button">PlaySegment</button><br>
    </Media-Action-Control>
</MEDIA-SEGMENT>
```

---

Some of the key points to be noted in the above examples are as listed:

i. Attributes of Linkage-metadata elements MEDIA-POINTER & MEDIA-SEGMENT denote a specific point or segment on the media file, respectively. Each location is defined by at least one of time-offset, frame-offset, byte-offset and (x, y) coordinates of the screen.

ii. At Pre-load time, Multimedia-manipulator reads all the Linkage-Metadata elements that do not have attribute usage-time set to 'Play-Time'. Linkage-metadata is then used to display a default marker/icon at the specified location on the media file to enable co-relation of metadata & media content. Default marker can be over-ridden by explicitly providing an icon or GIF using a designated attribute. In some embodiments, the icon or GIF chosen is a function of metadata value associated to the linkage-metadata.

iii. Media-Action-Control: This element comes with a user-interface control, which when selected by user, triggers a named program on multimedia-manipulator remotely.

iv. In an embodiment, Metadata-manipulator reads sub-elements with attribute usage-time set to 'Play-time'. They are typically associated with user-interface controls, denoted by element 'Media-Action-Control' here. As shown in these examples, this UI control triggers mapped programs on media-manipulator, that results in playing of the media from the point denoted by Linkage-metadata, as it is relevant to that section of metadata. As can be seen in the Example-1, when user clicks on the button 'PlayFromHere', a function is called that triggers a remote procedure call on the media-manipulator to reposition the cursor of the media-manipulator to a position indicated by the Linkage-Metadata, in order to play the media from that point onwards. In Example-2, user's selection of the button 'PlaySegment' triggers a remote procedure on the media-manipulator that plays the segment of the media file identified by the linkage-metadata. The details of how a handle to media-manipulator process is obtained by the metadata-manipulator is not detailed here as standard 'Inter-Process-Communication' protocols or 'Remote-Procedure-Call' techniques are used as relevant to specific deployment scenarios, to achieve this.

v. Element 'Media-Label' denotes an alphanumeric string or image that should be used to identify that point or linkage-metadata on the media file. A default icon is used if no image is specified in the element. In an embodiment, the linkage-metadata can be selected using voice commands mentioning the name of the linkage-metadata, in this example, as defined by the attribute 'Media-Label'.

FIG. 1a illustrates an exemplary embodiment to display video on television with QR-Code pointing to the metadata that can be scanned by a mobile device to view the metadata and FIG. 2a illustrates an exemplary embodiment to display an image with URL pointing to metadata file being displayed on the side of the image. In some embodiments, QR-Code could be replaced by new types of special purpose machine readable codes such as a modified barcode, morse-code, etc., that point to resources other than html pages like a mobile application or a screen on a mobile application, wherein the programs to retrieve and render the metadata pointed by the URL is available on the reading device. In typical embodiments, a scannable code such as QR-Code can be scanned by an external device such as a mobile phone, to facilitate rendering of the metadata on the scanning device. In yet other embodiments, the URL or QR-CODE pointing to metadata can be rendered as an user-interface control or as an interactive image that responds to different user input such as click, touch, tap, voice commands, etc., by rendering the metadata pointed to by the URL on either same window or screen or on a new instantiated window or screen.

The present disclosure describes three types of embodiments to render or consume multimedia and its metadata. First one is where the multimedia file and metadata file are both consumed on one device, but are processed by two independent processes, one each for metadata-manipulation and media-manipulation, such that they render the files on two different display frames, windows, screens or hardware monitors, both connected to the same CPU. In such a deployment, the two processes could communicate with each other to pass event triggers and metadata using any of the standard IPC (Inter Process Communication) protocols. In some cases, the communication channel could be uni-directional and in others bi-directional as per specific needs of a usage scenario. An e.g. for metadata rendering program could be a browser like program, rendering metadata represented in the form of xml or html like page, wherein the multimedia file is rendered in a separate frame or section of the same browser page or a different page altogether. In some embodiments, metadata can be stored in a database that is retrieved by scripts in the html like page by the metadata-manipulator and passed to media-manipulator as needed. When a process is communicatively coupled to another, it can initiate triggers in the other process to activate preconfigured trigger-handlers and also pass metadata as parameters for the triggers. Triggers and trigger-handlers can also be called events and event-handlers.

In second case, another exemplary embodiment, metadata-manipulation process, and a media-manipulation process could be on different devices. In such an embodiment, it is assumed that both the devices can have access to the metadata file, since the media-manipulator needs to pre-load all the static metadata upfront, wherein the static metadata to be displayed are those that do not have label 'Play-Time'.

In an exemplary embodiment, the system has independent processes for metadata-manipulator and multimedia-manipulator, with the processes running on independent devices, and with communication between the devices enabling tandem display of the media file; wherein current position of media file can be changed on demand by user, based on current position on the metadata file. Such a system will require at least a uni-directional communication channel between the metadata manipulator and the media-manipulator, where the two devices are communicatively coupled using existing technologies such as Bluetooth, Infra-red, Wifi, etc. used by a typical media-player and a remote, but with the remote having an additional feature of a display unit & a processor, to render the metadata file. In such a remote device, the screen controls could very well be software controls on the display unit. In some embodiments it may be desired to move the cursor on the metadata-manipulator to reflect the position on the media-manipulator on user request (for e.g. conveyed by selecting a UI control). In an exemplary implementation involving a media-player and a mobile app acting as a remote, this can be achieved by the mobile-app-remote, on user action, initiating a current position query on the media-player using a Remote Procedure Call (RPC) and using the returned current position to change the current position on the mobile-app-remote, to facilitate consumption of metadata relevant to currently being played media segment. Although such a communication channel is not truly bidirectional, it facilitates most user requirements.

A third form of deployment is where the metadata manipulator is running on one or more independent user devices and captures new user generated metadata at run time as depicted in FIG. 4. Data captured at run time is referred to as dynamic metadata and can include such things as likes, user comments, notes, polls, quizzes, etc. In an exemplary implementation, metadata-manipulator uploads some of this dynamic metadata to a preconfigured central server for further processing and consolidation. For instance, poll results from all users can be consolidated into a bar-graph that can be displayed on the media file. The central server is equipped with programs that use AI and human input to filter and process user generated content, where processing is a function of configurations, user attributes and attributes of devices involved. Such processed data is then passed onto the streaming server that is communicatively coupled with the central server and is rendering content to all user devices. In an exemplary deployment, the user devices could be TVs or OTT screens. Thus, the processed and consolidated user generated dynamic metadata can be rendered on or near the multimedia screen for end user consumption.

An advantage of having separate process for media file and metadata file manipulation is that viewers can capture detailed metadata while watching a media file, like in a classroom. Such metadata is referred to as dynamic metadata that may be personal to a user based on user settings. In an embodiment, metadata for a media file being played on a media-player can be captured on a wireless remote device, for e.g. on an app on a mobile phone, which acts as the metadata manipulator. Metadata or notes so captured can be accurately overlayed on the media file during the next play of the same media, if the metadata is persisted by the metadata manipulator and time of each discrete metadata data capture is also stored with the metadata. In a simple implementation, each discrete metadata set can be identified when user uses a carriage return, or next line character to separate notes being taken down. These times can then be synched with the media by subtracting start-time of media play from the metadata capture time to arrive at the accurate time-offset to overlay the notes on the media file.

Further, in an embodiment, after dynamic metadata is captured, it needs to be saved by clicking on a control designated for that purpose. On the save event, metadata manipulator will recompute the linkage-metadata values that are impacted by any pauses & re-starts on the media file, by querying for the pause and restart times from the media manipulator and adjusting the time-tags of the new metadata by subtracting any pause durations preceding any metadata's time-tag as detailed in the referenced document. In some embodiments, there can be a separate window/screen to capture viewer's dynamic metadata.

Thus, dynamic metadata of a media file also comprises of data such as start time of media play, pause-times and their corresponding re-start times of the media play so as to enable computing of accurate time-tags for any new metadata (such as viewer's notes, comments, etc.) captured for the multimedia file. The time-tags referred to here are equivalent to linkage-metadata for the new metadata. This will enable accurate linkage of the new metadata to the media file and also facilitates overlaying of the new metadata onto the media file. The process of using the dynamic metadata of various times to compute the linkage metadata is detailed in the U.S. Pat. No. 10,552,482 B2 "An electronic system and method for marking highlights in a multimedia file & manipulating the multimedia file using the highlights". Thus, dynamic metadata of various times enables easier consumption of the media and its dynamic metadata; provided it reaches the metadata manipulator. In an embodiment, the dynamic metadata of start-time, pause-times & re-start-times are returned as parameters to a query from the metadata manipulator at the end of the media play. In another embodiment, this data is encoded as a machine readable code, such as a QR-Code, at the end of rendering the media and displayed on or near the media, so as to enable the metadata manipulator to read it with the device it is running on, and then use it to compute right linkage-metadata to the new dynamic metadata before persisting the same.

Another benefit of the present disclosure is the facility of an elaborate search, that can provide search results containing matches within the metadata file and the multimedia file as two lists or a single list. Search results pointing to the multimedia file is actually a Linkage-metadata list that has adjacent metadata matching the search string in the metadata file. In an embodiment using XML/HTTP like syntax in the metadata file to represent linkage-metadata, a Linkage-metadata is added to the search result, if any of its attributes or sub-elements have values matching the searched string.

In an embodiment, search results are listed as either hyper-links themselves or are accompanied by a page/line number that is a hyper link to the matching metadata. Search results having matches on the media file have to point to sections from both the metadata file and the media file; and hence are accompanied by an UI control that can render the media from that point onwards. For e.g. the 'Arrow' in the FIG. 5a.

The process of getting or computing the linkage-metadata or positional-coordinates can be many. In a simple implementation, we can assume that existing media players or rendering software will be able to provide these coordinates to viewers, who can then manually enter the data into the metadata file. However, there can be user interface tools that can be employed to do the job in a more automated manner. An ideal embodiment will be where a special purpose editor or developer-studio program is built to facilitate easy creation of metadata file for a given multimedia file, so that people not familiar with HTML/XML syntax can also benefit from this disclosure. In an exemplary implementation of the manipulators, linkage metadata can be copied to memory from a media file using simple point-and-copy user action with a touchpad or mouse button click interface, and then pasted into the metadata file to create linkage-metadata. Similarly, drag-and-drop facility can enable addition of user-interface controls and formatting elements from a pre-configured set, into the metadata manipulator.

In an exemplary embodiment, technology protocols such as Bluetooth, Wi-Fi and infra-red (IR) typically used between a media player and a remote device, can be modified & effectively used for communicating between the metadata manipulator & media manipulator. In an implementation, the remote device can be a mobile phone application running the metadata manipulation process, while the media manipulator can be running on a device like a media-player or a desktop screen. As per this disclosure, IPC protocols based on Wi-Fi, Bluetooth or IR protocols may need to be enhanced or adapted with a customised session layer and application layer implementations to support triggering of pre-configured events with metadata subsets as parameters, in order to facilitate tandem consumption of the two files.

The minimum metadata parameter that needs to be supported is 'media start position' from where the media-player should start playing the media, although having facility to support a media segment with both start and end positions would be ideal. Alternately, the device playing the multimedia file can also have access to metadata file and load the metadata as part of pre-load process, and only process simple navigation instructions at run time using commands from a remote device connected over standard Wi-Fi, IR or Bluetooth protocols. The simple commands that such a remote can generate are 'jump to next' or 'jump to previous' linkage-metadata or bookmarks/filemarks. Such an embodiment may not support bi-directional tandem consumption of the media and metadata files. To support bi-directional tandem consumption of the media file and metadata file, application on remote device such as a mobile phone can use enhanced communication protocols based on standard protocols such as WiFi, Bluetooth or IR in order to support parameters comprising linkage-metadata that needs to be communicated to the media manipulator. Further, the navigational events generated by the remote is also communicated to the metadata-manipulator on the remote device in order to facilitate repositioning of the metadata file's cursor to reflect the cursor position on the media file.

Figure 5B:
FIG. 5b illustrates an exemplary embodiment of a videobook on two devices with Table-of-Contents repeated for each device.
Figure 5C:
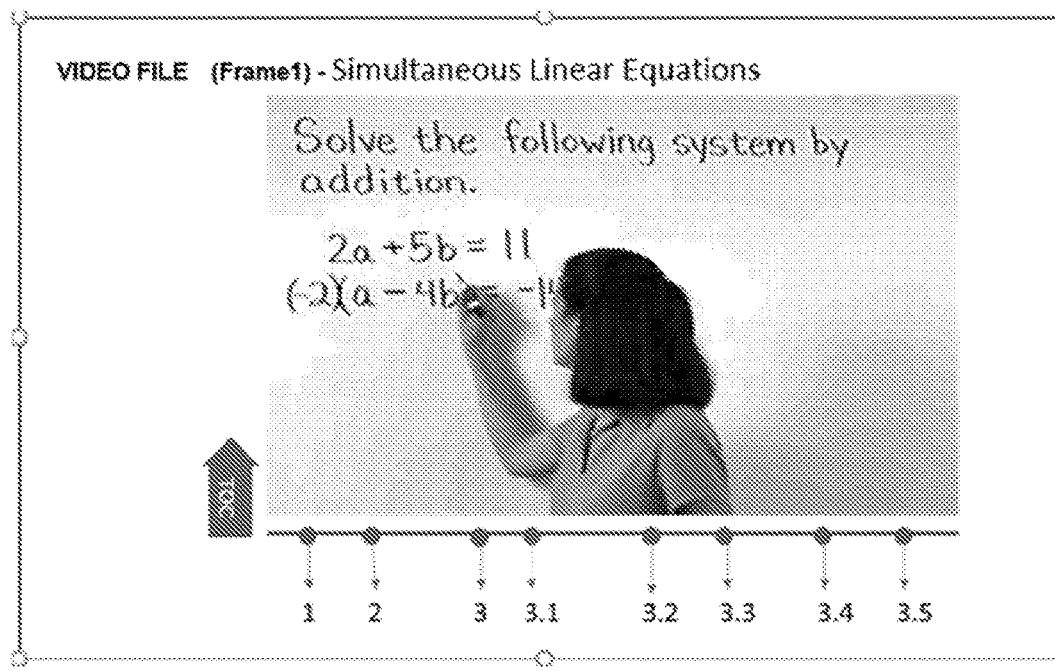
FIG. 5c illustrates an exemplary embodiment of a videobook on single or two devices with a separate frame (window) for user specific dynamic metadata capture.
Figure 5C:

There are several deployments possible to implement this disclosure as depicted in FIGS. 5a, 5b and 5c. The FIG. 5a depicts various implementation details of an embodiment having three screens, windows or frames, where the third screen is for Table-of-Contents; actually a component of the metadata file, managed by the metadata-manipulator; but separated into a screen of its own, to enable flexible arrangement of the three components. The example in FIG. 5b has two screens, with Table-of-Contents repeated in both the screens for easier consumption. The third example FIG. 5c has a fourth screen specifically to capture dynamic metadata.

Further, there can be a platform or a device with a database of videos and their corresponding metadata files, where each pair of files constitute a digital book. In an embodiment referred to a video-book here, the metadata file can be an ebook and the media file is a video or audio representation of the ebook, wherein the ebook or metadata file has linkage-metadata to appropriate locations in the video/audio file to facilitate tandem consumption of the two components. In an exemplary embodiment, the metadata file can be a digital textbook with multiple videos linked to a single metadata file, where each video represents a video-lesson corresponding to chapters in the digital textbook. Such a system will have one-to-many relationship between the one metadata file and the many media file(s), but still facilitate tandem consumption of the composite metadata file and the many component media file(s) like in the embodiments described above. The difference in such an embodiment is that the linkage-metadata in the composite metadata file, will contain a qualifier that is an URL to one of the many media files it is related to. Here again, there can be a default media file URL referred to in the beginning, which will be used in absence of URL qualifier at any linkage-metadata.

The digital books can be searched for a required topic, and the search results comprise matches from multiples books in one list; where each search result comprises a link to a linkage-metadata that can be used to view at least one of the matching metadata file and its corresponding multimedia file at the position pointed to by the matched linkage-metadata.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations, or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following detailed description.

Finally, the language used in the specification has been principally selected for readability and instructional purposes, and the language may or may not have been selected to delineate or circumscribe the inventive subject matter. The language is therefore intended to show that the scope of the invention is not to be limited by this detailed description, but rather by any claims issued on an application based here on. Accordingly, the disclosure of the embodiments of the invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer implemented system and methods to manipulate independently, a multimedia file and a metadata file corresponding to the multimedia file, wherein a multimedia manipulator process manipulates the multimedia file and a metadata manipulator process manipulates the metadata file that stores metadata associated with the multimedia file;
   wherein one of the two processes is initiated first by opening corresponding content file, and then a program file of a second process and corresponding content file are accessed and initiated either programmatically or as a result of a preconfigured user action, wherein the program file along with the content file of the second process are accessible to at least one of the first process and a user;
   wherein the metadata manipulator process and multimedia manipulator process are communicatively coupled at run-time through either a one-way communication channel or a two-way communication channel for enabling tandem consumption of the multimedia file and the metadata file by passing at least one of pre-configured event triggers and preconfigured types of metadata between the two processes, where the tandem consumption indicates an ability to consume either the multimedia file or the metadata file independently while being able to instantly jump from one file to the other file in response to an user input, without losing context defined by the current file position in the first file from where a jump request was initiated.

2. The system as claimed in claim 1, wherein the access to a second file is available to at least one of the user and the process of the rendered first file, in the form of at least one of i) hyperlink, ii) a user-control and iii) a machine-readable-code; either a) always, b) at preconfigured periodicity or c) on-demand in response to preconfigured user input.

3. The system as claimed in claim 1, wherein the metadata file comprises at least two kinds of programmatically parse-able, pre-defined tags namely:
   a) display tags to indicate metadata that is to be rendered on the multimedia file—along with optional attributes to define (i) formatting details to be used for rendering, and (ii) a set of destination user-interface windows or screens to render the metadata on; and
   b) linkage tags and attributes to denote a linkage between the metadata file and the multimedia file in terms of positional information where a positional information can be at least one of (i) a particular point in the multimedia file or (ii) a section of the multimedia file denoted by two points; where a point in the multimedia file is defined in terms of at least one of byte-offset, time-offset, frame-offset and screen coordinates (x, y); depending on the type of the multimedia file, and the positional information is used by the multimedia-manipulator to perform at least one of i) render a metadata subset denoted by display tags enclosed within current linkage-metadata at that defined position or elsewhere on a user-interface screen with a pointer to that defined position and ii) resume media rendering from that position.

4. The system as claimed in claim 1, wherein the metadata file comprises a third kind of programmatically parse-able, predefined tag with attributes to define methods to be executed as event-triggers by at least one of (i) metadata manipulator, (ii) media manipulator and (iii) external systems, along with a metadata subset to be passed as method parameters.

5. The metadata manipulator as in claim 1, comprises utilizing the metadata file to perform at least one of:
   a) process raw metadata and render the same, using formatting specifications provided, to facilitate easy consumption of the metadata by end users;
   b) listen to preconfigured events using event handlers, to receive new metadata from user interfaces or external programs including the multimedia manipulator and perform at least one of (i) new metadata computation using received new metadata and old metadata, (ii) Store new metadata either received or computed into a preconfigured storage location along with linkage-metadata comprising file-pointer to the multimedia file position received as part of new metadata or computed based on time of receiving new metadata and (iii) forward new metadata computed or received to external systems including multimedia-manipulator;
   c) provide instant access to parts of the multimedia file pointed to by linkage-metadata in the metadata file, on preconfigured user input at linkage-metadata, by generating pre-programmed 'jump' event trigger on multimedia-manipulator with linkage-metadata as a parameter; wherein the multimedia-manipulator responds to the trigger by playing the media from the location denoted by passed linkage-metadata, thereby enabling toggle to multimedia file consumption from metadata consumption without losing a current context as defined by the current position on the metadata file, thereby facilitating tandem consumption of the multimedia file and the metadata file;
   d) generate pre-programmed event triggers on multimedia-manipulator in response to preconfigured user input at linkage-metadata in the metadata file, along with parameters comprising at least one of user input data and associated subset of metadata from the metadata file, wherein the multimedia player responds to the trigger by using the passed metadata parameters to display the same on the multimedia file or elsewhere on the same screen as the multimedia file with a pointer to the location denoted by passed linkage-metadata,
   e) listen to preconfigured 'jump' event from multimedia player using event-handlers, with a parameter comprising the current position on multimedia file, and respond by jumping to a linkage-metadata (file-pointer) in the metadata file that is nearest to received media file's current position, wherein nearest indicates a linkage metadata occurring immediately before the current position of media file in chronological terms and within the same parent linkage metadata, and in absence of which, an immediate parent linkage-metadata occurring chronologically before the current position of media file, thereby facilitating tandem consumption of the of the multimedia file and the metadata file;

f) provides quick and easy navigation within the metadata file and across the metadata file and the multimedia file using features that include (i) search with search results and (ii) responsive table-of-contents comprising of linkage-metadata that can be selected in two ways through at least one UI control, to do at least one of iia) show detailed metadata adjacent to searched string and iib) trigger multimedia manipulator to render the multimedia file from a point corresponding to the selected linkage-metadata in the metadata file.

6. The system as claimed in claim 3, wherein Display-Tags and Display-metadata includes as attributes at least one of i) icons or animated images (GIFs), ii) responsive UI controls, iii) labels and iv) subtext/captions to be rendered on the multimedia file.

7. The multimedia-manipulator method of claim 1, comprising a specialized multimedia player that i) pre-reads the metadata file by parsing for linkage-metadata tags and any associated display-tags and nested metadata, ii) stores them in memory and iii) renders the linkage-metadata and at least part of associated display tags on multimedia file or media progress-bar at start time of a media play.

8. The system as in claim 7 comprising an event listener that listens to pre-configured events triggered by the metadata manipulator, to perform at least one of:
a) jump to a specified position in multimedia file indicated by event parameter and render multimedia from that position onwards; and
b) render passed metadata subset on multimedia file, media progress bar or on the same screen as the multimedia file as per passed additional parameters that include at least one of positional information using linkage-metadata and formatting data; wherein the positional information is used to determine a display location for a pointer to displayed metadata or display location for the metadata itself.

9. The multimedia-manipulator as in claim 8, comprises listening to preconfigured user events using an event listener, including events generated by pre-configured UI-controls; and responds by triggering an event on metadata manipulator with the current location of the multimedia file as a parameter; which results in the metadata-manipulator repositioning its current position to a linkage-metadata that is nearest to the passed current location parameter, where nearest is defined as a linkage metadata occurring immediately before the current position of media file in chronological terms and within the same parent linkage metadata, and in absence of which, an immediate parent linkage-metadata occurring chronologically before the current position of media file, thereby facilitating tandem consumption of the two files.

10. The system as claimed in claim 1, wherein the metadata file is at least one of a flat file, xml file, html file, a modified version of the same, or a mobile app screen.

11. The method as claimed in claim 2, wherein the multimedia manipulator generates machine readable code to access the metadata file dynamically and includes as parameters, in addition to URL of the metadata file, partial dynamic metadata about the media file, comprising at least one of i) current position of media file playing in terms of time-offset to facilitate positioning of a cursor on the metadata file at a linkage metadata that is nearest, wherein nearest indicates linkage metadata occurring immediately before the current position of media file in chronological terms and ii) a handle to an instance of media rendering program to facilitate communication of event triggers and metadata by the metadata manipulator to the media file.

12. The method as in claim 11, wherein the multimedia manipulator records and stores dynamic data regarding current instance of media-manipulator, to pass it to metadata-manipulator at times that comprise (a) immediately, (b) at the end of play; in the form of at least one of i) a parameter to a trigger generated on Metadata-manipulator, ii) as a return parameter to a request initiated by the metadata-manipulator and iii) as a rendered machine-readable code; wherein the dynamic metadata comprises media's play-start-time and one or more times of media's pause and re-play, so as to enable metadata rendering program to compute accurate linkage-metadata for any new metadata received from the multimedia file.

13. The system as claimed in claim 2, wherein the location and format of rendering of the metadata link and the metadata itself on the multimedia-manipulator is a function of at least one of i) user profile, ii) device profile and iii) system configuration, changeable based on user input.

14. The system as claimed in claim 1, wherein the multimedia file is an image, video, or audio file.

15. The multimedia-manipulator method as in claim 11, comprising rendering a metadata file link as a responsive user interface control, triggering different pre-configured responses to different user input; wherein the different pre-configured responses include a) opening the metadata file in either a new window/screen or same window/screen as the media file itself, b) switching to the already open metadata manipulator window and repositioning the cursor to the position pointed to by a linkage-metadata that is the nearest and chronologically before a current position parameter received from the media player.

16. The method as in claim 15, wherein one of the pre-configured response is to replace the metadata file link with a visual cue at the edge of the multimedia screen, wherein the cue is responsive and responds to preconfigured user input by rendering a clickable or scannable link to the metadata file.

17. The method as in claim 9, comprising pausing rendering of the media file before triggering certain preconfigured events on metadata manipulator.

18. The method as in claim 6, wherein the metadata manipulator facilitates rendering UI controls for acceptance of user input that can become part of dynamic metadata, wherein, a time of user input is used to compute Linkage metadata for the captured user input (in terms of time-offset), if the multimedia file is a video or audio file.

19. The system as claimed in claim 1, wherein the metadata manipulator comprises user controls to search for specific metadata such that the results include all lines from the metadata file that contain the searched string; wherein the results that are not within any linkage-metadata structure, when selected, reposition a metadata file cursor to a matching line within the metadata file, and the results pointing to lines within a linkage-metadata structure come with two User Interface options: i) one that can render multimedia file from the point denoted by parent linkage metadata containing the matching searched string and ii) another that repositions the metadata file cursor to the matching searched string within the metadata file.

20. The method as claimed in claim 5, wherein the metadata manipulator creates a table-of-contents comprising all linkage-metadata with UI controls, to enable user to select an entry in the table-of-contents; wherein user's selection of an entry in the table-of-contents will do at least one of (i) trigger multimedia manipulator to render multimedia from that point onwards or (ii) reposition the metadata file's cursor to point to the selected linkage-metadata occurring in the metadata file; based on preconfigured type of user input.

21. The method as claimed in claim 20, wherein the table-of-contents is rendered in a separate frame or window by the metadata manipulator to facilitate displaying of it alongside at least one of the multimedia file and the metadata file.

22. The system as claimed in claim 1, wherein the two processes of metadata manipulator and multimedia manipulator run on independent devices that are communicatively coupled.

23. The system as claimed in claim 3, wherein at least one of the linkage-metadata and user-interface controls are identified with an alpha-numeric identity that is used for selecting the same with a voice command, where the voice command is processed by an event listener spawned by at least one of multimedia manipulator and metadata manipulator.

24. The system as claimed in claim 6, where the attributes for linkage-metadata comprising at least one of a marker and a label, are chosen as a function of values associated to other attributes of the current-element, parent-element or sub-elements of the linkage-metadata.

25. The system as claimed in claim 3, comprises a composite metadata file that is linked to one or more component media files, wherein each of the linkage-metadata in the metadata file is qualified by an URL pointing to the right media file for that linkage-metadata.

26. The system as claimed in claim 3, is deployed on a platform or a device with a collection of metadata files and their corresponding media files, wherein a search for a required topic generates search results comprising matches from multiple metadata files in one list; where each search result comprises a link to a metadata file that is used to view at least one of (i) a matching line in the metadata file and (ii) its corresponding multimedia file at a position pointed to by the nearest linkage-metadata.

27. The system as claimed in claim 1, where the metadata manipulator is an application running on a mobile device communicatively coupled with media manipulator process running on the same device or a separate media playing device.

28. The system as claimed in claim 1, further comprising running multiple instances of the metadata manipulator on one or more independent user devices to capture new user generated metadata at run time, which user generated metadata is uploaded to a preconfigured central server on user request or as per configured periodicity for further processing and consolidation of metadata, so as to facilitate display of consolidated metadata information by at least one of media-manipulator and metadata-manipulator as a result user request or periodic queries to the central server.

29. The multimedia manipulator method as in claim 7, comprises rendering of play-time metadata at a time corresponding to time-offset (or frame-offset that is converted to time-offset) defined by linkage-metadata stored by a pre-read process, in case of videos and audio files; and wherein the rendering action is triggered by a cron job spawned by the multimedia manipulator.

* * * * *